United States Patent
Mancuso et al.

[11] Patent Number: 5,876,162
[45] Date of Patent: Mar. 2, 1999

[54] APPARATUS FOR REMOVING DROSS RIDGES FROM A METAL WORKPIECE

[75] Inventors: Matthew A. Mancuso, New Kensington, Pa.; Joseph A. DePasquale, Surfside Beach, S.C.

[73] Assignee: Keibler-Thompson Corporation, New Kensington, Pa.

[21] Appl. No.: 956,828

[22] Filed: Oct. 23, 1997

[51] Int. Cl.⁶ ........................................ B23D 1/00
[52] U.S. Cl. ........................ 409/300; 409/139; 409/297; 409/308; 409/321
[58] Field of Search ................................. 409/139, 140, 409/297, 298, 300, 301, 308, 321, 322, 323, 324, 325

[56] References Cited

U.S. PATENT DOCUMENTS

| | | | |
|---|---|---|---|
| 3,077,819 | 2/1963 | Kirkpatrick et al. | 409/308 |
| 3,377,896 | 4/1968 | Corta | 409/138 |
| 3,457,834 | 7/1969 | Seeloff et al. | 409/301 |
| 3,954,044 | 5/1976 | Ridgway | 409/139 |
| 4,357,817 | 11/1982 | Linsinger | 409/301 |
| 4,522,540 | 6/1985 | Hasebe et al. | |
| 4,859,126 | 8/1989 | Mancuso | |
| 4,874,274 | 10/1989 | Mancuso | 409/300 |
| 5,259,440 | 11/1993 | Lotz et al. | |
| 5,597,030 | 1/1997 | Lotz et al. | 409/301 |

Primary Examiner—Steven C. Bishop
Assistant Examiner—Adesh Bhargava
Attorney, Agent, or Firm—Bell Seltzer Intellectual Property Law Group of Alston & Bird LLP

[57] ABSTRACT

An apparatus for removing the dross ridges which are formed on the lower surface of a metal workpiece during torch cutting of the workpiece. The apparatus includes a support beam having generally flat upper and lower surfaces, and a cutting edge extending longitudinally along each of its four corners. The beam is positioned to extend across and below the workpiece path of travel, and the beam is rotatable between a neutral position wherein one of the upper and lower surfaces is just below the pass line of the workpiece, and opposite tilted positions in which one of the cutting edges engages and removes a dross ridge on the lower surface of the workpiece. Each of the cutting edges comprises a plurality of separately pivotable cutting blades, so that the cutting edge formed by the blades is able to closely conform to a non-linear surface contour of the workpiece.

16 Claims, 2 Drawing Sheets

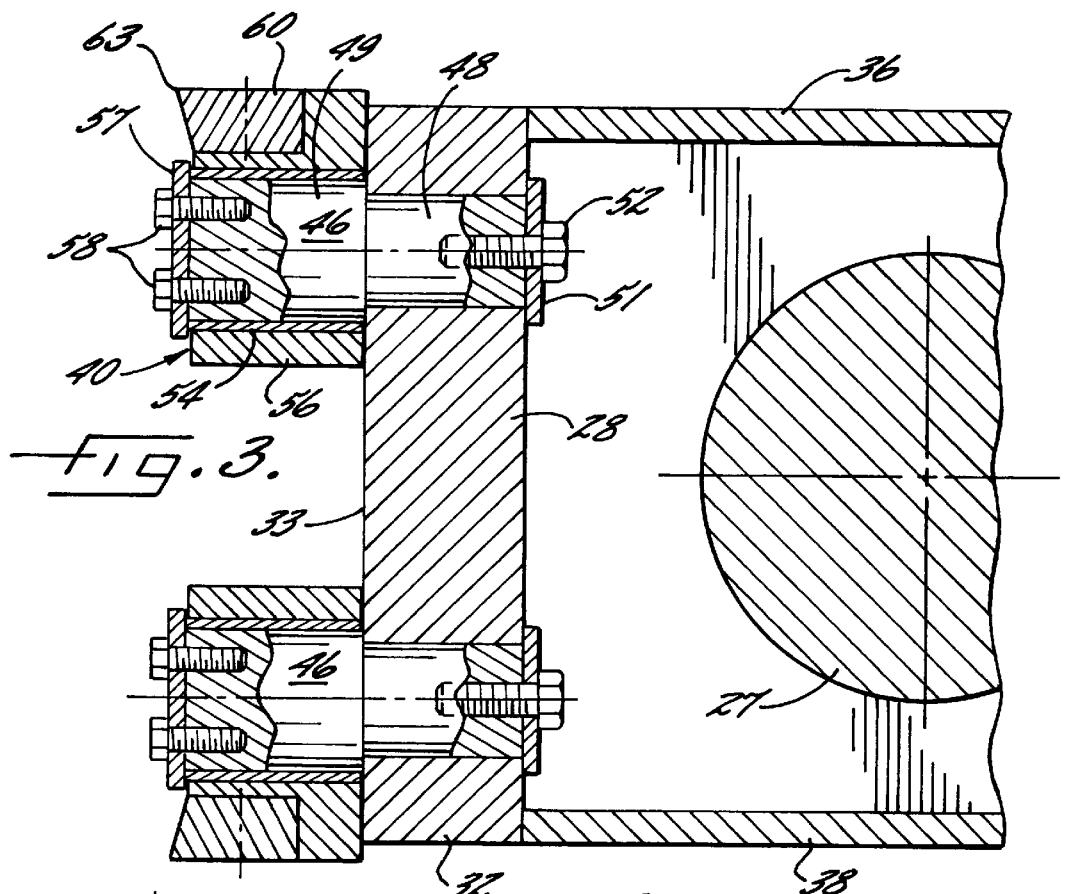
Fig. 3.
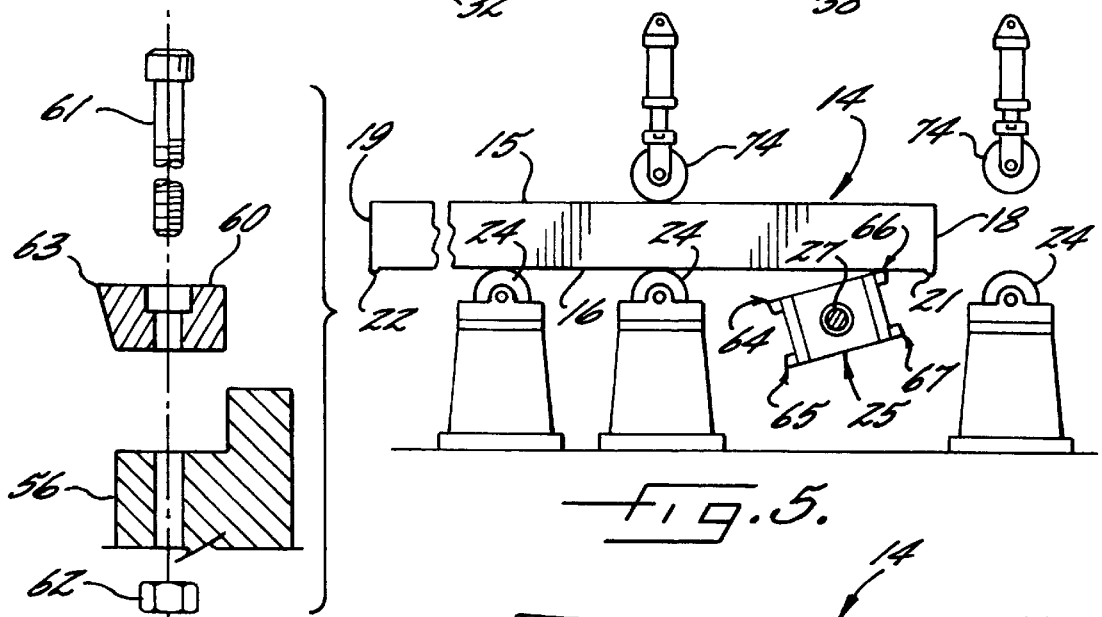
Fig. 4.
Fig. 5.
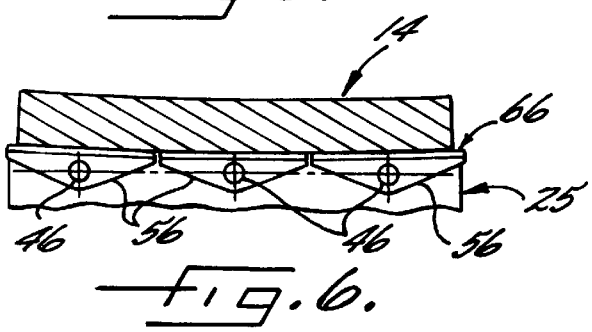
Fig. 6.

APPARATUS FOR REMOVING DROSS RIDGES FROM A METAL WORKPIECE

BACKGROUND OF THE INVENTION

The present invention relates to an apparatus for removing dross ridges from metal workpieces, such as slabs, blooms, billets, or the like.

In the production of steel by, for example, the continuous casting process, the continuous cast length emerging from the caster is cut into desired lengths to form separate metal workpieces, which are commonly referred to as slabs, blooms, or billets. The separate workpieces are then subjected to subsequent processing, as by rolling, to form a finished steel product.

The cutting operation as described above is conventionally performed by means of a flame or torch, wherein a jet of high purity oxygen is directed against the workpiece while it is heated to the oxygen ignition temperature. The resulting exothermic chemical reaction between the iron and oxygen produces slag or waste, which consists of iron oxide, metallic iron and other alloy elements. This slag or waste is in the molten state, and it is displaced during the cutting operation and a portion thereof forms a ridge of the material along the lower edge of the cut end. Upon cooling, the material solidifies and adheres to the workpiece surface along the bottom surface adjacent the cut end, and forms what is commonly called a "dross ridge".

The formation of the dross ridges on the workpiece presents problems in the further processing thereof. For example, a dross ridge may drop off in the reheat furnace, which requires that it then be removed, thus involving additional labor. Also, in the event the dross ridge remains adhered to the workpiece during reheating, it is laminated into the steel during rolling of the workpiece, resulting in an inferior product.

Heretofore, the dross ridges resulting from a torch cutting operation have been removed by a process involving inverting the workpiece and removing the dross ridges with scarfing torches. However, the required additional handling of the workpiece entails additional equipment and labor. Mechanical chippers or chisels have been employed for this purpose, but this also is a labor intensive process.

U.S. Pat. No. 4,859,126 discloses an apparatus for efficiently removing dross ridges immediately after the workpiece has been cut, and which comprises a dross removal beam having a generally flat outer surface and a cutting edge along each of its two opposite sides. The blade is positioned to extend across and below the workpiece path of travel, and the blade is rotatable between a neutral position wherein the blade is below the pass line of the workpiece, and opposite tilted positions in which one or the other of the cutting edges engages the lower dross carrying surface of the workpiece, and so that each cutting edge is adapted to engage and "deburr" a dross ridge on the workpiece.

The dross removal beam as disclosed in the above-referenced patent is primarily used to deburr rectangular steel slabs that are formed by the most widely used steel solidifying process, i.e. continuous casting. Inherent in the continuous casting process is the fact that the broad surface of the slab to which the dross ridge adheres may be bulged, resulting in a slightly convex or concave surface profile. The amount of the bulge will vary based on size of the slab and other factors, and it can sometimes be severe enough to prevent continuous contact between the cutting edge of the dross removal beam along the entire surface of the slab. In addition to bulging, there may be other profile distortions in the slab caused by mechanical or thermal influences which can also prevent adequate contact of the cutting edge with the surface of the slab. These conditions can adversely affect the performance of the dross removal beam, lowering its overall reliability.

It is accordingly an object of the present invention to provide a dross removal beam of the described type which effectively overcomes the above noted limitations of the prior beam.

It is a more particular object of the present invention to provide a dross removal beam which is able to effectively remove a dross ridge along a convex or concave surface of the slab.

SUMMARY OF THE INVENTION

The above and other objects and advantages of the present invention are achieved by the provision of a dross removal beam which comprises an outer surface and preferably two longitudinally extending side edges which extend along respective opposite sides of the outer surface. A plurality of cutting blades are pivotally mounted along each of the side edges, with the blades being longitudinally aligned so as to define a substantially continuous cutting edge along each side edge. Thus, in use, the blades are able to freely pivot so as to closely conform to the contour of the workpiece, and the entire length of the dross ridge may thereby be engaged and removed.

In a preferred embodiment, the support beam comprises a main shaft which defines a longitudinal axis, and a pair of longitudinally extending side plates which are joined to the main shaft on respective opposite sides thereof. The side plates collectively define oppositely facing upper and lower surfaces and oppositely facing side surfaces, and the cutting blades are mounted to the side plates by means of pivot shafts which are reasonably mounted to the associated side plate and so as to extend perpendicularly therefrom.

Each of the cutting blades preferably comprises a blade holder rotatably and removably mounted to an associated pivot shaft, and an insert removably joined to said blade holder. The insert has a relatively sharp edge which forms a portion of the length of said continuous cutting edge. By this arrangement, the removal and replacement of the cutting edges can be effected without disassembling the entire support beam from its mounting.

It is also preferred to have the cutting edges extend longitudinally along each of the four corners of the support beam. Thus the support beam has two sets of cutting blades, so that one set can be held in reserve while the other set is being utilized, and the useful life of the blades can be in effect doubled before the support beam must be shut down and serviced for the replacement of the cutting edges.

BRIEF DESCRIPTION OF THE DRAWINGS

Some of the objects and advantages of the present invention having been stated, others will appear as the description proceeds, when taken in conjunction with the accompanying drawings, in which

FIG. 3 is an enlarged sectional view of the dross removal beam, taken along the line 3—3 of FIG. 2;

FIG. 4 is an exploded sectional view of a blade holder and insert of the beam, and taken along the line 4—4 of FIG. 2;

FIG. 5 is a fragmentary side elevation view of the workpiece conveying line with the dross removal beam of the present invention; and FIG. 6 is a fragmentary view, looking in the direction of the slab advance, and illustrating the manner in which the cutting blades of the beam conform to the contour of a non-linear slab.

DETAILED DESCRIPTION OF THE INVENTION

Figure 1:
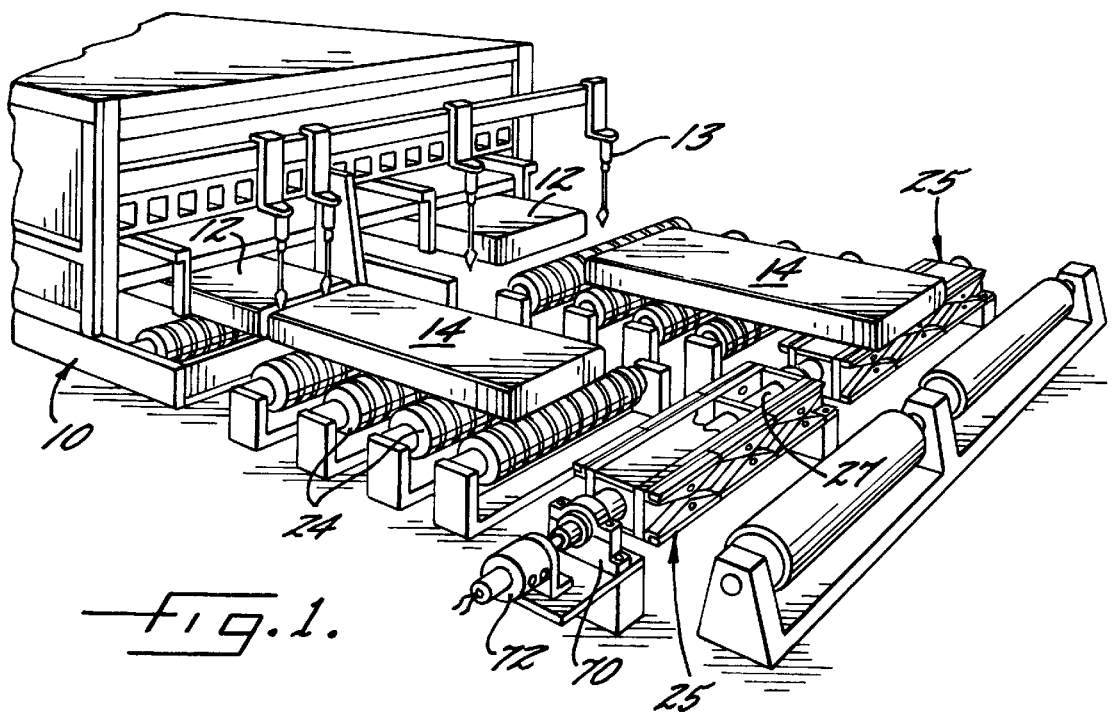
FIG. 1 is a perspective view of a continuous metal casting machine and the dross removal apparatus of the present invention.
Figure 2:
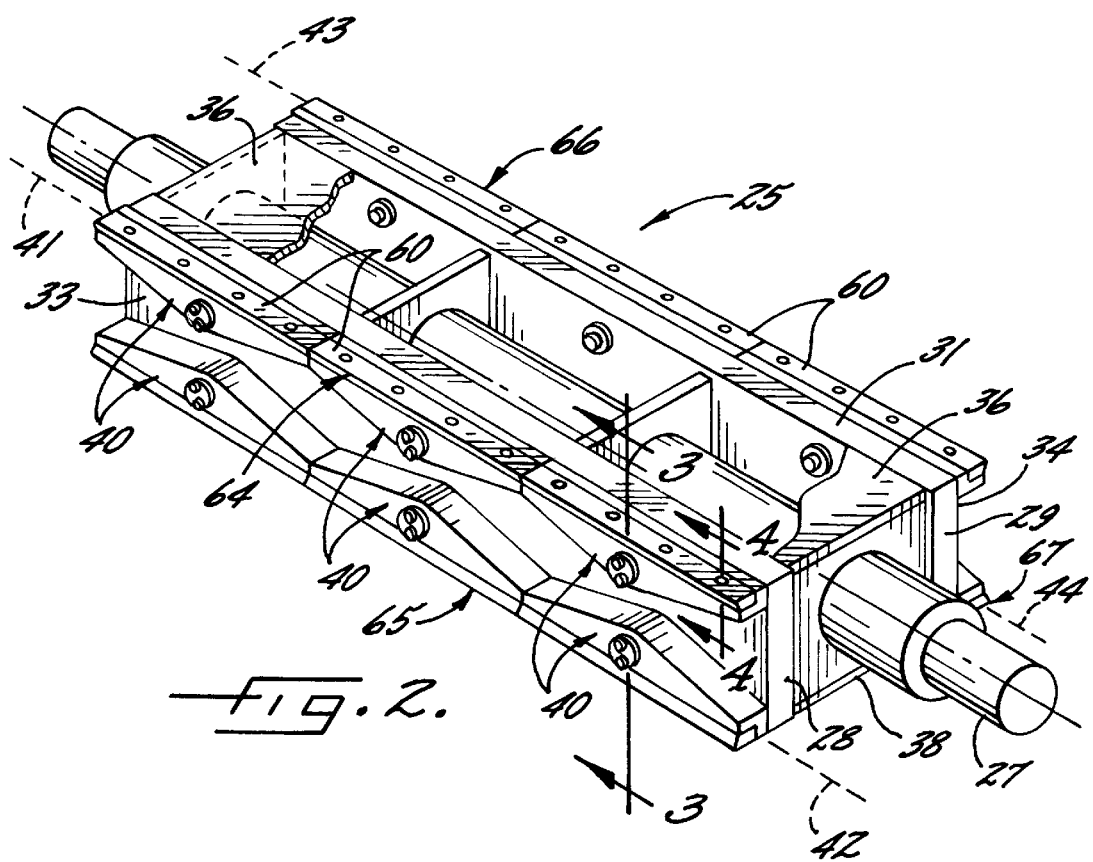
FIG. 2 is a perspective view, partly broken away, of the dross removal beam shown in FIG. 1.

Referring more particularly to the drawings, FIG. 1 illustrates a conventional steel casting machine 10, of a type which is adapted to form two parallel continuous castings 12, 12'. Several oxygen cutting torches 13 are mounted at the downstream end of each output line, to cut the castings into separate slabs, blooms, or billets, which are referred to herein as workpieces 14. As best seen in FIG. 5, each workpiece 14 has an upper surface 15, a lower surface 16, a leading end 18, and a trailing end 19'. Also, the workpiece includes a dross ridge 21, 22' formed on the lower surface adjacent the leading end 18 and the trailing end 19' of the workpiece, respectively, as a result of the torch cutting operation.

The apparatus includes conveyor means in the form of a series of driven conveyor rolls 24, for advancing each workpiece along a horizontal path of travel, with the direction of the advance being such that the ends 18, 19' and the dross ridges 21, 22' are disposed perpendicular to the path of travel. However, this orientation may not be exactly perpendicular, since the torches 13 may be set to cut the workpieces at the angle, or the workpieces may shift on the rolls 24. In addition, the conveyor rolls 24 are adapted to selectively advance each workpiece in opposite directions along a horizontal path of travel, and in the manner further described below.

The apparatus of the present invention further comprises a dross removal support beam 25 mounted transversely across and below the path of travel of each workpiece 14. The beam 25 comprises a main shaft 27 which defines a longitudinal axis, and a pair of longitudinally extending side plates 28, 29 joined to the main shaft 27 on respective opposite sides thereof. The side plates 28, 29 thus define a generally rectangular box-like structure when viewed in transverse cross section, and they define oppositely facing upper and lower surfaces 31, 32 and oppositely facing side surfaces 33, 34. A top cover plate 36 extends between the upper ends of the side plates 28, 29 and is coplanar with the upper surface 31, and a similar bottom plate 38 extends between the lower ends of the side plates 28, 29 and is coplanar with the lower surface 32.

In the illustrated embodiment, the support beam 25 mounts a line of cutting blades 40 along each of its four corners. More particularly, a plurality of cutting blades 40 are mounted along a first longitudinal line 41 which is adjacent the juncture between the upper surface 31 and the side surface 33 of the side plate 28, and along a second longitudinal line 42 which is adjacent the juncture between the lower surface 32 and the side surface 33 of the side plate 28. The other side plate 29 has blades 40 mounted along corresponding third and fourth lines 43, 44. Thus the blades 40 along the first and third lines 41, 43 define a first pair of cutting edges which are alternately utilized to remove dross ridges in the manner described below, and the blades 40 along the second and fourth lines 42, 44 define a second pair of cutting edges which are alternately utilized.

The structure for pivotally mounting the cutting blades 40 to each of the side plates 28, 29 includes a plurality of pivot shafts 46. As best seen in FIG. 3, each pivot shaft 46 includes two coaxial shaft segments 48, 49 of different diameter and so as to define a radial shoulder therebetween. The small diameter segment 48 is received in a bore in the side plate 28, and it is removably retained therein by means of a washer 51 and a bolt 52. The large diameter segment 49, which extends perpendicularly from the outer side surface 33 of the side plate 28, mounts a coaxial bushing 54, which in turn supports a blade holder 56 so as to be freely rotatably about the axis of the pivot shaft 46. The holder 56 is removably secured over the bushing 54 by means of a washer 57 and pair of bolts 58.

Each blade holder 56 includes a cut-out which removably mounts an insert 60 by means of several socket head cap screws 61 and nuts 62, note FIG. 4. Each insert 60 extends longitudinally along the upper side of the holder 56 and includes a cutting edge 63. Also, the blades 40 are positioned immediately adjacent to each other in the longitudinal direction so that the cutting edges 63 of the inserts 60 form a substantially continuous cutting edge along the full longitudinal length of each of the four corners of the beam 25. More particularly, the inserts 60 of the blades 40 along the line 41 define a continuous cutting edge 64, the inserts 60 of the blades 40 along the line 42 define a continuous cutting edge 65, the inserts 60 of the blades 40 along the line 43 define a continuous cutting edge 66 and the inserts 60 of the blades 40 along the line 44 define a continuous cutting edge 67.

A number of bearing blocks 70 are provided for mounting the shaft 27 and thus the support beam 25 for pivotal movement about its longitudinal axis, and such that the support beam is adapted to be mounted immediately adjacent the path of travel of a metal workpiece 14 supported by the conveyor system 24 and with the longitudinal axis extending across the workpiece path of travel, as seen in FIG. 1.

A hydraulic drive motor 72 with a conventional position resolver is provided for selectively pivoting the support beam 25 about its longitudinal axis and so that any one of the cutting edges 64–67 may be held in contact with the adjacent lower surface 16 of a workpiece 14 moving along the path of travel, and such that each cutting edge is adapted to engage and remove a dross ridge 21, 22 formed on the adjacent workpiece. As illustrated in FIG. 5, a pair of pinch rolls 74 may be provided to support the workpiece relative to the beam 25, and which serve to prevent the lifting of the workpiece upon impact of a dross ridge with a cutting edge of the beam.

The method of operating the dross removal apparatus of the present invention is further described in the above referenced U.S. Pat. No. 4,859,126, the disclosure of which is expressly incorporated herein by reference. To briefly summarize, the workpiece 14 is advanced by the conveyor rolls 24, and after the leading end 18 of the workpiece passes the beam 25, the beam is tilted so that the cutting edge 64 which opposes the dross ridge 22 at the trailing end of the workpiece is tilted into contact with the lower surface 16 of the workpiece. As the workpiece continues to advance, the cutting edge 64 engages and removes the dross ridge 22 at the trailing end. Thereafter, the workpiece advance is reversed, and the beam 25 is returned to its neutral position. The beam is then tilted in the opposite direction so that the cutting edge 66 engages the bottom surface of the workpiece, and continued movement of the workpiece in the reverse direction causes the cutting edge 66 to engage and remove the dross ridge 21, note FIG. 5. The advance of the workpiece is then again stopped and reversed so that it advances in the forward direction, and the beam is tilted to its neutral position where it awaits the next workpiece.

In instances where the transverse contour of the workpiece 14 is convexly or concavely curved as illustrated in FIG. 6, the individual cutting blades 40 will separately rotate about the axis of their respective pivot shafts 46, so as to closely conform to the curved outline of the lower surface of the workpiece. As a result, substantially the entirety of the dross ridge may be efficiently removed.

In normal operation, only the two upper sets of cutting blades, i.e. those along the lines 41, 43, will be utilized. However, in the event the upper cutting blades should require repair or replacement, the entire beam 25 may be rotated 1800 by the drive motor 72, so that the other pair of cutting blades, i.e. those along the lines 42, 44, may be utilized. Thus the repair or replacement operation can be postponed until the second pair of blades also needs repair or replacement, and as a result, the beam 25 can remain in service for longer periods of time and the shut down of the continuous casting line can be minimized.

In the drawings and specification, there has been set forth a preferred embodiment of the invention, and although specific terms are employed, they are used in a generic and descriptive sense only and not for purposes of limitation.

That which is claimed:

1. An apparatus for removing a dross ridge of the type formed along the edge of a metal workpiece as the result of a torch cutting operation or the like, comprising an elongate support beam which defines an outer surface and at least one longitudinally extending side edge, a plurality of cutting blades, and means pivotally mounting said cutting blades to said support beam along said one side edge, with the blades being longitudinally aligned so as to define a substantially continuous cutting edge along said one side edge.

2. The apparatus as defined in claim 1 further comprising means mounting said support beam for pivotal movement about a fixed longitudinal axis.

3. The apparatus as defined in claim 2 further comprising drive means for selectively pivoting said support beam about said longitudinal axis.

4. The apparatus as defined in claim 3 wherein said outer surface is generally flat, and wherein said support beam includes at least two parallel side edges which extend along respective opposite sides of said outer surface.

5. The apparatus as defined in claim 4 wherein said cutting blades are pivotally mounted along each of said two side edges, with the blades along each side edge being longitudinally aligned so as to define a substantially continuous cutting edge.

6. The apparatus as defined in claim 5 wherein said mounting means comprises a plurality of pivot shafts which are releasably mounted to said support beam in a longitudinally spaced apart arrangement along each of said two side two edges.

7. The apparatus as defined in claim 6 wherein each of said cutting blades comprises a blade holder rotatably and removably mounted to an associated pivot shaft, and an insert removably joined to said blade holder, said insert having a relatively sharp corner which forms a portion of the length of the associated continuous cutting edge.

8. An apparatus for removing a dross ridge of the type formed along the edge of a metal workpiece as the result of a torch cutting operation or the like, comprising an elongate support beam comprising a main shaft which defines a longitudinal axis, a pair of longitudinally extending side plates joined to said main shaft on respective opposite sides thereof, with said side plates being parallel to each other so as to collectively define oppositely facing upper and lower surfaces and oppositely facing side surfaces, a plurality of cutting blades, and means pivotally mounting said cutting blades to each of said side surfaces along a longitudinal line which is adjacent the juncture between said upper surface and the associated side surface, with the blades of each line being longitudinally aligned so as to define a substantially continuous cutting edge along the longitudinal length of said juncture, and with the blades being separately pivotable about respective axes which are perpendicular to the associated side surface.

9. The apparatus as defined in claim 8 further comprising means mounting said support beam for pivotal movement about said longitudinal axis, and such that the support beam is adapted to be mounted immediately below the path of travel of a metal workpiece supported by a conveyor system and with the longitudinal axis extending across the workpiece path of travel.

10. The apparatus as defined in claim 9 further comprising means for selectively pivoting said support beam about said longitudinal axis and so that either one of said cutting edges may be held in contact with the adjacent surface of a workpiece moving along said path of travel, and such that each of said cutting edges is adapted to engage and remove a dross ridge formed on the adjacent workpiece.

11. The apparatus as defined in claim 10 wherein said mounting means comprises a plurality of pivot shafts which are releasably mounted to the associated side plate in a longitudinally spaced apart arrangement and so as to extend perpendicularly from the associated side plate, with each of said cutting blades being rotatably and removably mounted to an associated pivot shaft.

12. An apparatus for removing a dross ridge of the type formed along the edge of a metal workpiece as the result of a torch cutting operation or the like, comprising an elongate support beam comprising a main shaft which defines a longitudinal axis, a pair of longitudinally extending side plates joined to said main shaft on respective opposite sides thereof, with said side plates being parallel to each other so as to collectively define oppositely facing upper and lower surfaces and oppositely facing side surfaces, a plurality of cutting blades, and means pivotally mounting said cutting blades to each of said side surfaces along a first longitudinal line which is adjacent the juncture between said upper surface and the associated side surface and along a second longitudinal line which is adjacent the juncture between said lower surface and the associated side surface, with the blades of each line being longitudinally aligned so as to define a substantially continuous cutting edge along the longitudinal length of said juncture, and with the blades being separately pivotable about respective axes which are perpendicular to the associated side surface.

13. The apparatus as defined in claim 12 further comprising means mounting said support beam for pivotal movement about said longitudinal axis, and such that the support beam is adapted to be mounted immediately below the path of travel of a metal workpiece supported by a conveyor system and with the longitudinal axis extending across the workpiece path of travel.

14. The apparatus as defined in claim 13 further comprising means for selectively pivoting said support beam about said longitudinal axis and so that any one of said cutting edges may be held in contact with the adjacent surface of a workpiece moving along said path of travel, and such that each of said cutting edges is adapted to engage and remove a dross ridge formed on the adjacent workpiece.

15. The apparatus as defined in claim 14 wherein said mounting means comprises a plurality of pivot shafts which are releasably mounted to the associated side plate in a longitudinally spaced apart arrangement and so as to extend perpendicularly from the associated side surface, with each of said cutting blades being rotatably and removably mounted to an associated pivot shaft.

16. An apparatus for removing a dross ridge of the type formed along the edge of a metal workpiece as the result of a torch cutting operation of the like, comprising an elongate support beam, said beam defining a longitudinal axis and being of generally rectangular outline in transverse cross section so as to define four longitudinally extending corners, and said beam including a substantially continuous cutting edge extending longitudinally along each of the four corners of the beam, and means mounting said support beam for pivotal movement through at least 1800 about said longitudinal axis, and such that the support beam is adapted to be mounted immediately below the path of travel of a metal workpiece supported by a conveyor system and with the longitudinal axis extending across the workpiece path of travel, and any one of the cutting edges may be held in contact with the adjacent surface of a workpiece moving along said path of travel, and such that any one of the cutting edges is adapted to engage and remove a dross ridge formed on the adjacent workpiece.

* * * * *

UNITED STATES PATENT AND TRADEMARK OFFICE
CERTIFICATE OF CORRECTION

PATENT NO. : 5,876,162

DATED : March 2, 1999

INVENTOR(S) : Mancuso et al.

It is certified that error appears in the above-identified patent and that said Letters Patent is hereby corrected as shown below:

Column 8, line 6, "1800" should read --180°--.

Signed and Sealed this

Sixth Day of July, 1999

Attest:

Attesting Officer

Q. TODD DICKINSON

Acting Commissioner of Patents and Trademarks